United States Patent

[11] 3,589,130

[72] Inventors: Heinz Flaschar, Ludwigsburg; Wilhelm Weigert, Schwieberdingen; Walter Werner, Waiblingen; Manfred Kramer, Fellbach-Lindle, all of, Germany
[21] Appl. No.: 872,673
[22] Filed: Oct. 30, 1969
[45] Patented: June 29, 1971
[73] Assignee: Robert Bosch GmbH, Stuttgart, Germany
[32] Priority: Nov. 6, 1968
[33] Germany
[31] P 18 07 171.1

[54] ELECTROHYDRAULIC REMOTE CONTROL OF HYDRAULIC VALVES
13 Claims, 3 Drawing Figs.

[52] U.S. Cl.................................................. 60/52 VS, 60/DIG. 2
[51] Int. Cl............................................... F15b 11/16, F15b 15/18
[50] Field of Search........................................ 60/52 VS, DIG. 2

[56] References Cited
UNITED STATES PATENTS

| | | | |
|---|---|---|---|
| 2,243,364 | 5/1941 | Trautman.................. | 60/52 |
| 2,316,926 | 4/1943 | Willett....................... | 60/52 VS UX |
| 2,838,908 | 6/1958 | Forster...................... | 60/52 VS X |
| 2,977,765 | 4/1961 | Fillmore.................... | 60/52 VS |

Primary Examiner—Edgar W. Geoghegan
Attorney—Michael S. Striker

ABSTRACT: An arrangement for controlling remotely hydraulic valves located between a variable displacement pump and a load supplied from the pump. The valve has a control slider the position of which is indicated through a signal generator on the slider. Control levers are also coupled to the slider and the position of these levers is indicated through another signal generator coupled to the levers. A control unit connected to the signal generators, compares their signal outputs and actuates electrohydraulic positioning means for controlling the pump flow as a function of the deflection of the control levers.

INVENTORS:
Heinz FLASCHAR
Wilhelm WEIGERT
Walter WERNER
Manfred KRÄMER

By
their ATTORNEY

ELECTROHYDRAULIC REMOTE CONTROL OF HYDRAULIC VALVES

BACKGROUND OF THE INVENTION

The present invention resides in an arrangement for remote control of valves through electrohydraulic means. The valves, in particular, control the fluid flow of a variable displacement pump to the load.

An arrangement as known in the art, which has a plurality of electrical remotely controlled servo valves which are supplied from one common variable displacement pump. This known arrangement, however, has only an electrical control for the servo valves and does not have, any valves with control sliders which may be regulated through corresponding control lever positions. The variable displacement pump which is regulated to a maximum pressure, has the disadvantage that the required pressurized flow for the pump stroke, must flow off through a pressure limiting valve, in the neutral position of the valves to be regulated. This condition results in power losses and, above all, heating of the oil. The arrangement known in the art, moreover, uses servo valves with nozzles and impact plate, and consequently the construction is relatively complex and costly.

Accordingly, it is an object of the present invention to provide an arrangement for the electrohydraulic remote control of hydraulic valves which are supplied through a variable displacement pump. It is a specific object of the present invention to provide for precise remote control of the control slider and the variable displacement pump through simple means and low power losses.

The objects of the present invention are achieved by providing an electrical signal generator with at least one controllable valve at the control slider. The signal generator emits a signal dependent upon position, and the control lever arranged with the control slider has a corresponding electrical signal generator. An electrical control unit is provided through which the quantities of the signal generators are compared. The electrical control unit, furthermore, is operatively connected with an electrohydraulic positioning arrangement at the control slider, when the signals correspond or influence each other. The electrical control unit is also operatively coupled with an electrohydraulic positioning arrangement of the variable displacement pump, and the operation of the control unit is made dependent upon the pump stroke or pump displacement as a function of the control lever deflection.

An arrangement of the preceding species for remote control of control sliders, is particularly well adapted for an desired application. The regulation of the position of the control slider operates in a very precise manner even though a simple design is used, and this makes possible an errorless precise control. The remotely controlled variable displacement pump maintains the power losses of the arrangement substantially small.

An advantageous design of the present invention is realized through regulation of the variable displacement pump with the aid of the electrical control unit, through an electrohydraulic positioning arrangement and a signal generator. Through such an arrangement, a particularly well-operating and precise positioning of the pump stroke is realized.

It is particularly advantageous to connect an electromagnetic actuated switching valve parallel to the electrohydraulic positioning arrangement for the pump stroke setting or displacement. This switching valve is in operative connection with the electrical control unit. As a result, the power losses of the pressurized fluid required for the pump displacement, is maintained low.

A pressure retaining valve or a separate feed pump for producing a control pressure may be of advantage in the present arrangement of the invention.

SUMMARY OF THE INVENTION

An arrangement for controlling remotely valves situated between a variable displacement pump and a load which receives fluid from the pump. The valve is provided with a control slider to which a first signal generator is arranged so that the position of the control slider is converted into a corresponding electrical signal. The control slider is coupled to control lever, and a second signal generator at the control levers provides signals dependent upon the position of these levers. A control unit is connected to the first and second signal generators for comparing their output signals. Electrohydraulic positioning means, furthermore, is coupled to the control slider and to the pump for controlling the flow rate from the latter in dependence upon the deflection of the control levers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
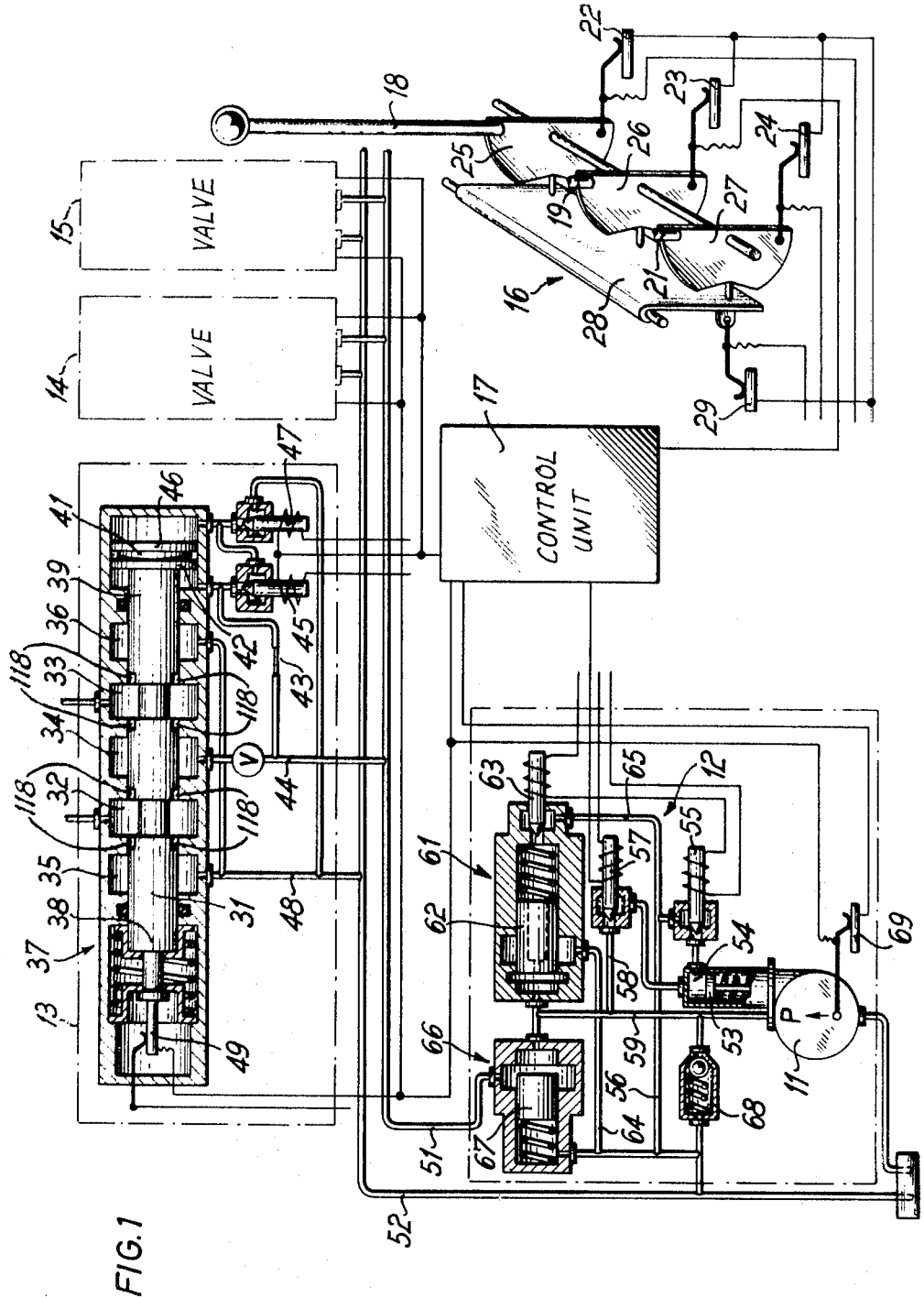
FIG. 1 is a functional schematic of a remote control arrangement for the electrohydraulic control of hydraulic valves and variable displacement pump, in accordance with the present invention.

Referring to the drawing, and in particular to FIG. 1, the latter includes a variable displacement pump 11 with electrohydraulic actuated positioning or displacement arrangement 12, three identical valves 13, 14 and 15 with electrohydraulic actuation, and operating apparatus 16, an electrical control apparatus 17, as well as the required hydraulic and electrical interconnections. The electrical control apparatus 17 can, of course, also be constructed in the form of an electronic control circuit.

The operating apparatus 16 has three control levers 18, 19 and 21 which are displaceable toward both sides from a neutral position. Signal generators 22, 23 and 24 are arranged for each control lever and are provided for the control slide of the valve 13, 14 and 15. Every control lever has, furthermore, a cam disc 25, 26 and 27 which influence a signal generator 29 for the valve 12, through a common lever arrangement 28. All signal generators 22, 23 and 24, 29 are connected, through electrical lines, with the electrical control apparatus. For the purpose of simplifying the drawing, the structural details are shown only for the valve 13, since the valves 14 and 15 are identical to the valve 13.

The valve 13 has a control slide 31 which blocks, in the neutral position, two chambers 32 and 33 against an inflow chamber 34 and two return flow chambers 35 and 36. A double-acting return arrangement 37 at one end 38 of the control slider 31 centers the latter in the neutral position. At the other end 39, a differential piston 41 is arranged. The side of the piston 42 with the smaller area, communicates with an orifice 43 and hence with an inflow channel 44. The side 42, furthermore, communicates with the larger area side 46 through an electromagnetic valve 45. The latter is connected, in turn, with a return flow channel 48, through an electromagnetic valve 47. The magnetic coils of both electromagnetic valves 45 and 47 communicate with the electrical control apparatus 17. At the end of the return arrangement 37 which carries the control slider, an electrical signal generator 49 is, furthermore, arranged. This electrical signal generator is also connected to the electrical control unit 17.

The inflow channel 44 in the valve 13 connects the inflow chamber 34 with an inflow line 51 extending from the variable displacement pump 11, whereas the return flow channel 48 connects the return flow chambers 35 and 36 with a return flow line 52 leading to the storage tank.

The valves 14 and 15 are, similarly, connected with the flow line 51, the return flow line 52 and the electrical control unit 17.

The variable displacement pump 11 has a positioning arrangement 12 with a piston 53 subjected to pressurized fluid on one side, for the purpose of establishing the stroke. The pressure chamber 54 which receives the piston, is connected with a return flow channel 56, through a second electromagnetic valve 55. This chamber 54 is, furthermore, connected with a pressure channel 59 from the variable displacement pump 11, through a first electromagnetic valve 57 and a channel 58. Between the pressure channel 59 and return flow channel 56, a precontrolled valve 61 is connected in parallel with the positioning arrangement 12. The valve 61 has a spring-loaded slider 62 and is controlled through an electromagnetic valve 63. Two channels 64 and 65 lead from the valves 61 and toward the return flow channel 56 which is connected with the return flow line 52. A pressure retaining valve 66 is, furthermore, built into the pressure channel 59 behind the branching of the positioning arrangement 12 and the valve 61. The piston 67 of the pressure retaining valve 66 connects with the return flow channel 56 on the spring-loaded side of the piston. A pressure-limiting valve 68 secures the pressure channel 59 which is connected with the flow line 51.

An electrical signal generator 69 is arranged at the variable displacement pump 11. The signal generator 69 provides electrical signals which are dependent upon the stroke of the pump. Connecting lines lead to the electrical control unit 17 from the signal generator 69, both electromagnetic valves 55 and 57 of the positioning arrangement 12, as well as the electromagnetic valves 63 of the switching valve.

In operation and in the neutral position of all control levers 18, 19 and 21, the electromagnetic valve 63 is opened, and also, thereby, the slider 62 of the valve 61. The variable displacement pump 11 is substantially set to zero flow rate and transmits solely the pressurized flow for the control of the positioning arrangement 12. The pressurized flow, however, flows through the valve 61 and the channel 64 and into the return flow channel 56 without pressure, and from there into the return flow line 52.

When deflecting the control lever 18 in any direction, the cam 25 actuates the signal generator 29 for the pump stroke displacement, through the lever arrangement 28. The signal generator 29 first closes the valve 61 through the electrical control unit 17. As a result, the pressure-retaining valve 66 within the pressure channel 59 throttles a control pressure which is made available for actuating the valves 13, 14 and 15, and the positioning arrangement 12.

The signal generator 29 for the pump stroke is continuously compared, through the electrical control unit 17, with the signal generator 69 at the variable displacement pump 11. For identical positions of the two signal generators 29 and 69, their quantities coincide. When such coincidence occurs, the electromagnetic valves 55 and 57 close off their connections, and as a result the piston head 53 of the positioning arrangement 12 becomes hydraulically blocked. By actuating the signal generator 29, the balance becomes disturbed, and the electrical control unit 17 opens the electromagnetic valve 57, whereas the electromagnetic valve 55 remains closed. The control pressure throttled from the pressure retaining valve 66, acts upon the piston head 53 through the channel 58 and the pressure space or chamber 54. This action upon the piston head 53 is maintained and the piston is displaced until the signal generators 29 and 69, which are compared through the electrical control unit 17, coincide or are in agreement. Accordingly, the variable displacement pump 11 provides increased flow of pressurized fluid with increased deflection of the control lever 18, and the flow is directed to the valve 13.

The signal generator 22 acts, correspondingly, on the control lever 18, and the signal generator 49 acts on the control slider 31 through the electronic control unit 17 and control together, thereby, the electromagnetic valves 45 and 47. When the control lever 18 is deflected towards the right, the signal generator 22 becomes simultaneously actuated with the neutral control, and as a result, the electrical control unit 17 opens the electromagnetic valve 47. At the same time, the electromagnetic valve 45 remains closed. With the fluid pressure acting upon the smaller area of the differential piston 41, the control slider 31 is moved towards the right, since the larger side 46 of the differential piston 41 is not under load to the return flow line 52. Through this motion, the control slider 31 connects, initially, the inflow chamber 34 with the chamber 32, and the other chamber 33 with the return flow chamber 36. The control slider 31 moves, thereby, towards the right until the signal generator 49 attains the position coinciding with the predetermined position of the signal generator 22. When this condition has been achieved, the electrical control unit 17 closes the electromagnetic valve 47 again, and blocks thereby the control slider 31 hydraulically and in the instantaneous position.

When the control lever 18 is now returned towards the left and into its neutral position, then the variable displacement pump 11 is returned to zero flow rate, in a correspondingly inverse manner. At the same time, the control slider 31 controls the connection to and from the load to which the energy is applied. As a result of the quantities provided by the signal generators 29 and 69, the electrical control unit 17 opens the electromagnetic valve 55, while the electromagnetic valve 57 remains closed. The spring-loaded piston 53 displaces the pump 11 in the direction for zero flow rate.

In view of the signal provided by the signal generators 22 and 49, the electrical control unit 17 opens the electromagnetic valve 45, whereas the electromagnetic valve 47 remains closed. As a result, the pressurized fluid moves the control slider 31 back to its neutral position, as a result of the differential effect of the piston 41. When the control lever 18 attains its neutral position and the signal generators 29 and 69 are in agreement, then the electronic control unit 17 actuates the switching valve 61, so that the operation of the pressure retaining valve 67 is terminated.

In a corresponding manner, the control slider 31 can also be moved out of its neutral position and towards the left, through the control lever 18.

When the valve 13 becomes simultaneously actuated with the valve 14, then the magnitude of the flow rate in the inflow line 51 is determined from the valve with the largest lever deflection, and the flow is subdivided between both valves corresponding to load pressure and position of the valve control chambers 118 for precise valve control.

When the electrical arrangement is turned off, all electromagnetic valves 45, 47, 55, 57 and 63 are opened. The return arrangement 37 returns the control slider 31 to its neutral position where it blocks a load member in order to avoid a possible accident. The variable displacement pump 11 is also returned into its zero position in which zero flow from the pump prevails, and the control flow may thereby flow off through the switching valve 61.

The pressure-retaining valve 66 can also be omitted, when the lowest anticipated load pressure is higher than the pressure required for the pump stroke.

Figure 2:
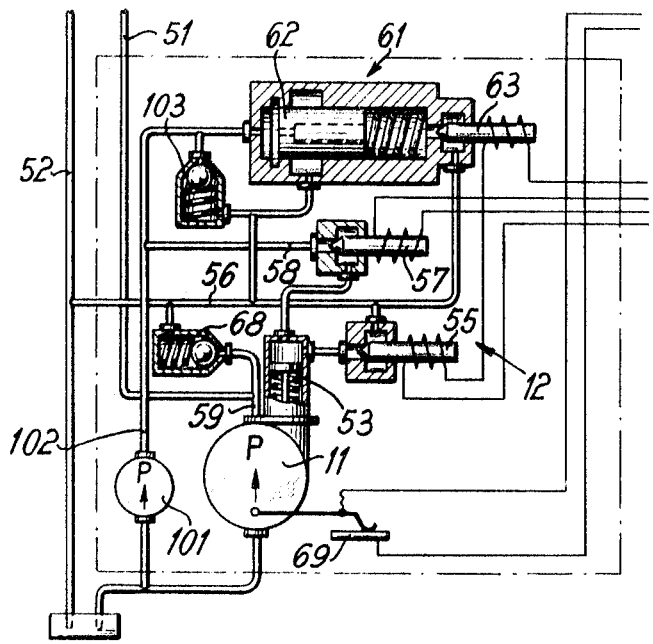
FIG. 2 is a functional schematic diagram of a portion of the arrangement of FIG. 1 and shows another embodiment for controlling the variable displacement pump.

In the embodiment of FIG. 2, a feed pump produces the required control pressure for the positioning arrangement. Identical parts therein are designated with identical reference numerals.

The embodiment of FIG. 2 differs from that of FIG. 1 essentially through the feed pump 101 associated with the variable displacement pump 11. A pressure channel 102 leads from the feed pump 101 to the channel 58 of the positioning arrangement 12. In parallel to the positioning arrangement, the switching valve 61 is connected the channel 102 and the return flow channel 56. A pressure-limiting valve 103 for determining the control pressure, secures the channel 102. The pressure channel 59 from the variable displacement pump 11 is connected only with the inflow line 51, and is secured through the pressure limiting valve 68, as in the embodiment of FIG. 1. A pressure retaining valve is, in this embodiment of FIG. 2, not required.

The operation of the embodiment of FIG. 2 corresponds considerably to that of FIG. 1. In contrast to the arrangement of FIG. 1, the variable displacement pump in FIG. 2 is not required to produce any control fluid flow for zero flow rate, since the control oil flow or control fluid flow is provided by the feed pump 101. In the neutral position of all control levers 18,19, and 21, the feed pump 101 is not loaded to the return flow channel 56, through the switching valve 61. When one control lever becomes actuated, the electrical control unit 17 closes the switching valve 61, and the pressure-limiting valve 103 determines the control pressure. Through the channel 58, the control pressure then acts upon the electromagnetic valve 57, the pressure space 54, and the piston 53 of the positioning arrangement.

Figure 3:
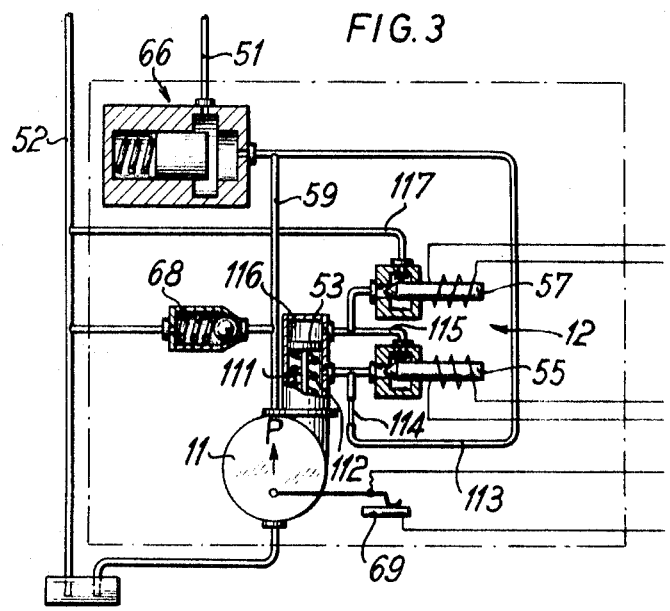
FIG. 3 is a functional schematic diagram and shows another embodiment of the arrangement of FIG. 2, in accordance with the present invention.

In the embodiment of FIG. 3, the control oil flow required for the positioning arrangement, is conducted directly to the return flow through its electromagnetic valves, so that one switching valve drops out. Identical parts in FIG. 3 and FIG. 1 are designated with identical reference numerals.

The embodiment of FIG. 3 differs essentially from that of FIG. 1 through the application of another circuit for the electromagnetic valves 55 and 57 relative to the piston 53 of the positioning arrangement 12. This piston 53 is constructed in the form of a differential piston which operates in conjunction with a spring 112 within the space 111 on the smaller area side of the piston. The space 111 connects a channel 113 with the pressure channel 59, through a throttling device or orifice 114. The space 111, furthermore, connects a channel 115 with the larger area side of the differential piston 53 and hence the space 116, through the electromagnetic valve 55. The space 116, furthermore, is connected with the return flow line 52, through a channel 117 and the electromagnetic valve 57.

The functional operation of the embodiment of FIG. 3 corresponds extensively with that of FIG. 1. In contrast to the arrangement of FIG. 1, the electromagnetic valves 55 and 57 are actuated when all control levers 18,19 and 21 are in their neutral position. Through the spring 112, a variable displacement pump 11 is substantially set to zero flow rate. The control oil flow from the variable displacement pump 11 solely reaches into the return flow line 52 from the pressure channel 59, through the channel 113, the orifice 114, the electromagnetic valve 55, the channel 115, the electromagnetic valve 57 and the channel 117. When the electromagnetic valve 57 closes through actuation of the control lever 18, the variable displacement pump 11 is set in the direction for greater flow rate, as a result of the differential effect of the piston 53. When the quantities of the signal generators 29 and 69 are finally in agreement, the electromagnetic valve 55 closes and the piston 53 becomes hydraulically blocked in the prevailing position. When the electromagnetic valve 57 now becomes actuated, the variable displacement pump 11 becomes hydraulically set in the direction of zero flow rate, while the electromagnetic valve 55 remains closed.

The embodiment of FIG. 3 has the advantage over that of FIG. 1, through the feature that a switching valve drops out, and the return of the setting of the variable displacement pump is accomplished hydraulically. For this reason, however, a somewhat more complex positioning arrangement with differential piston is realized.

The embodiment shown in FIG. 3 can be modified without difficulty so that the control oil flow is produced through a feed pump, as in FIG. 2. For this purpose, a variable displacement pump can be used which can be set or returned entirely to zero flow rate. In such a design, a pressure-retaining valve can also be omitted.

In the embodiments of FIGS. 1 and 2, the variable displacement pump 11 can also be regulated so that its signal generators 69 does not become compared with the signal generator 29 associated with all of the control levers. Instead, the signal generator 69 may be compared with the signal generators 22, 23 and 24 of each of the control levers. At the same time, the comparison may be made with the signal generator 49 of the control slider 31. Under such conditions, the electrical control unit 17 must provide a comparator output quantity from the last mentioned signal generators, which correspond to the maximum deflection of one of these elements out of its neutral position.

It will be understood that each of the elements described above, or two or more together, may also find a useful application in other types of constructions differing from the types described above.

While the invention has been illustrated and described as embodied in electrohydraulic remote control, it is not intended to be limited to the details shown, since various modifications and structural changes may be made without departing in any way from the spirit of the present invention.

What we claim as new and desire to be protected by Letters Patent is set forth in the appended claims:

1. An arrangement for remote control of valves comprising, in combination, variable displacement pump means for pumping fluid under pressure; a load for receiving said fluid pumped by said pump means; valve means with control slider connected between said pump means and said load for controlling the flow of said fluid to said load; first signal generator means at said control slider of said valve means for providing a signal dependent upon the position of said control slider; control lever means coupled to said control slider; second signal generator means at said control lever means for providing a signal dependent upon the position of said control lever means; control means connected to said first and second signal generating means and comparing the signals therefrom; first electrohydraulic positioning means operatively coupled to said control slider for controlling the position of said control slider as a function of the deflection of said control lever means and second electrohydraulic positioning means operatively coupled to said pump means and said control means for controlling said pump dependent upon the deflection of said control lever means.

2. The arrangement as defined in claim 1 including third signal generating means at said pump means and providing a signal dependent upon the stroke of said pump means, said third signal generating means being connected to said control means for comparing the signal from said third signal generating means with the signal from said first and second signal generating means, said control means being operatively connected with said second electrohydraulic positioning for controlling the stroke of said pump means dependent upon the deflection of said control lever.

3. The arrangement as defined in claim 1 wherein said second electrohydraulic positioning means comprises a piston movable by said fluid under pressure and a pressure space communicating with said piston.

4. The arrangement as defined in claim 3 including a first electromagnetic actuated valve with pressure channel communicating with said valve; and a second electromagnetically actuated valve with return flow channel, said pressure space communicating with said pressure channel and said return flow channel through said first and second electromagnetic valves.

5. The arrangement as defined in claim 4 including an electromagnetically controlled switching valve in parallel with said second electrohydraulic positioning means and operatively connected with said control means.

6. The arrangement as defined in claim 4 including auxiliary channel means connected with said pressure channel.

7. The arrangement as defined in claim 6 including pressure retaining valve means in said pressure channel and connected to the junction of said switching valve and said second hydraulic positioning means.

8. The arrangement as defined in claim 4 including feed pump means; and feed channel means connected with said auxiliary channel means.

9. The arrangement as defined in claim 8 including pressure limiting valve means communicating with said feed channel means for limiting the pressure or fluid therein.

10. The arrangement as defined in claim 1 wherein said second electrohydraulic positioning means comprises a differential piston subjectable to said fluid under pressure; a piston space communicating with said piston head; and spring means for maintaining said differential piston in its zero position.

11. The arrangement as defined in claim 10 including first electromagnetic valve means with return flow line means; second electromagnetic valve means communicating with said piston through a space lying on the opposite side of said piston from said piston space, said piston space communicating with said return flow line means and said space lying on said opposite side of said piston through said first and second electromagnetic valves; and further channel means connecting said space lying opposite to said piston space with said pump means.

12. The arrangement as defined in claim 1 including return flow line means communicating with said load and said electrohydraulic positioning means and providing return flow path for said fluid.

13. The arrangement as defined in claim 2 wherein said control lever means comprises a plurality of control levers, said second signal generating means being common to all said control levers and being comparable with said third signal generating means, said second signal generating means providing a signal representative of the maximum deflection of a control lever from neutral position.